United States Patent
Gerrits

(10) Patent No.: US 6,791,712 B1
(45) Date of Patent: Sep. 14, 2004

(54) METHOD AND APPARATUS FOR CONVERTING NON-PRINTABLE COLOR VALUES TO PRINTABLE COLOR VALUES

(75) Inventor: Carolus E. P. Gerrits, Velden (NL)

(73) Assignee: Océ-Technologies B.V., Venlo (NL)

( * ) Notice: Subject to any disclaimer, the term of this patent is extended or adjusted under 35 U.S.C. 154(b) by 0 days.

(21) Appl. No.: 09/352,609

(22) Filed: Jul. 13, 1999

(30) Foreign Application Priority Data

Jul. 13, 1998 (NL) .............................................. 1009623

(51) Int. Cl.⁷ .......................... G06F 15/00; G06K 1/00; G09G 5/02
(52) U.S. Cl. ....................... 358/1.9; 358/518; 358/523; 382/162; 382/167; 345/590
(58) Field of Search ................. 382/167, 166, 382/162; 358/1.9, 517, 518, 520, 523, 525; 345/590

(56) References Cited

U.S. PATENT DOCUMENTS

| | | | | |
|---|---|---|---|---|
| 5,185,661 A | * | 2/1993 | Ng .............................. | 358/1.9 |
| 5,237,409 A | * | 8/1993 | Yamaguchi .............. | 348/391.1 |
| 5,323,249 A | * | 6/1994 | Liang ......................... | 358/1.9 |
| 5,438,649 A | * | 8/1995 | Ruetz ......................... | 358/518 |
| 5,699,491 A | * | 12/1997 | Barzel ........................ | 358/1.9 |
| 6,124,945 A | * | 9/2000 | Ishihara et al. ............. | 358/1.9 |
| 6,292,195 B1 | * | 9/2001 | Shimizu et al. ............ | 345/604 |
| 6,323,969 B1 | * | 11/2001 | Shimizu et al. ............ | 358/523 |
| 6,411,304 B1 | * | 6/2002 | Semba et al. ............... | 345/590 |
| 6,532,081 B1 | * | 3/2003 | Cecchi et al. ................ | 358/1.9 |
| 6,611,356 B1 | * | 8/2003 | Shimizu et al. ............. | 358/1.9 |
| 2003/0001860 A1 | * | 1/2003 | Yamazaki et al. .......... | 345/590 |

FOREIGN PATENT DOCUMENTS

| | | | |
|---|---|---|---|
| EP | A20142975 | 5/1985 | |
| EP | 0679020 A1 | 10/1995 | |
| EP | 679020 A1 | * 10/1995 | ............ H04N/1/60 |
| EP | 0828381 A2 | 3/1998 | |
| WO | 95 22866 | 8/1995 | |

* cited by examiner

*Primary Examiner*—Kimberly Williams
*Assistant Examiner*—Melanie M. Vida
(74) *Attorney, Agent, or Firm*—Birch, Stewart, Kolasch & Birch, LLP

(57) ABSTRACT

A method and apparatus of converting a first color value as determined by first color co-ordinates in a color space defined by color parameters the first color co-ordinates being situated outside a boundary of a predetermined color range situated in the color space, to a second color value determined by second color co-ordinates in the color space, the second color co-ordinates being situated on said boundary of the color range. To this end, the method includes determining, in dependence on the distance of the first color co-ordinates from the boundary, an extended part of the boundary of the color range and establishing the second color co-ordinates on the basis of said extended part of the boundary. In one embodiment, the extended part of the boundary is determined by the boundary part situated between a first and second distance range from the first color co-ordinates and the second color co-ordinates are determined by the average of the color co-ordinates situated in that part of the boundary.

18 Claims, 8 Drawing Sheets

METHOD AND APPARATUS FOR CONVERTING NON-PRINTABLE COLOR VALUES TO PRINTABLE COLOR VALUES

BACKGROUND OF THE INVENTION

1. Technical Field of the Invention

The invention relates to a method and system for converting non-printable colour values to printable colour values.

2. Description of Related Art

A method of this kind is known from the International Patent Application WO95/22866, which mentions the problem when input colours cannot be reproduced by an image reproduction apparatus such as, for example, a printing device. This is due to the fact that a source of image signals, such as, for example, a scanner, display or graphic page composition software program, has a different colour range, also referred to as the "gamut", from an image reproduction apparatus such as a printing device or a display. In a printing device, the colour range to be reproduced is determined, inter alia, by the primary inks used, as in the case of an inkjet printer, or by the primary colour toners in the case of an electrophotographic printer.

This problem can generally be solved by compressing the entire input colour range that it fits in the reproducible output colour range. The disadvantage of this conventional technique is that all the input colour values, including the original values already situated in the output colour range, are changed.

Another conventional method converts only the colour values not situated in the output colour range to the closest colour values of the boundary of the output colour range, this process being known as clipping. For this purpose, a minimum Euclidean distance is calculated, in the colour space in which the colour values are defined, between an input colour and the closest output colour. This method is also used in the method described in the above-identified patent application.

A well-known disadvantage of clipping is that input colour values which are different from one another can be converted to one and the same output colour value. Another disadvantage of clipping is that two neighboring input colour values can be converted to two output colour values situated further apart. This occurs particularly if the boundary of the output colour range has a non-continuous configuration, the boundary in the colour space having sharply defined outwardly directed offshoots. Such offshoots usually correspond to the more intensively saturated primary colours as compared to mixed colours of lower saturation obtained by mixing the primary colours. Input colour values will then be converted to colour values corresponding to these offshoots rather than to the colour values situated between these offshoots, since the colour values situated further outside the input colour space are frequently the ones situated closest to these offshoots.

SUMMARY OF THE INVENTION

The method according to the invention overcomes these disadvantages. The present invention extends, in accordance with the selection rule, the closest part of the boundary by a part of the boundary situated in the colour space further away from the first colour co-ordinates, in dependence on the distance of the first colour co-ordinates from the boundary and establishes the second colour co-ordinates on the basis of the extended part of the boundary.

The reproduction system according to the invention includes a colour conversion unit adapted to generate the second colour value signal corresponding to the second colour co-ordinates, on the basis of colour co-ordinates which are situated in an extended part of the boundary of the predetermined colour range, which extended part is situated at a greater distance from the first colour co-ordinates, the extended part being determined in dependence of by the distance of the first colour co-ordinates from the boundary.

Instead of just taking for the conversion the part of the boundary situated closest to the first colour co-ordinates, consideration is now also given to parts of the boundary situated further away. In this way, the influence of any discontinuity in the boundary on establishing the second colour co-ordinates is reduced since a larger number of options is now offered. By taking into account the distance in the colour space between the first colour co-ordinates for conversion and the boundary, a gradual progression is obtained in the size of the extended part of the boundary so that there are less options for conversion for first colour co-ordinates situated close to the boundary than for colour co-ordinates situated further away.

Another embodiment of the method extends the boundary by selecting a part of the boundary which is situated between a first and second distance from the first colour co-ordinates defined in the colour space, wherein the first distance corresponds to the distance between the part of the boundary situated closest to the first colour co-ordinates, and the first colour co-ordinates, and the second distance is larger than the first distance. The extended part of the boundary can in this way be unambiguously determined while the colour co-ordinates corresponding thereto are always situated within a specific maximum distance from the first colour co-ordinates.

One advantageous embodiment of the method establishes the second distance by enlarging the first distance by a value equal to a constant factor times the first distance. The effect of this is that the closer the first colour co-ordinates are situated to the boundary so the extended part of the boundary for selection becomes smaller and finally coincides with the first colour co-ordinates. In this way, a continuous connection is obtained to the first colour co-ordinates which do come within the output colour space.

One embodiment of the method is determines a distance between two colour values in the colour space on the basis of a summation of quadratic differences between the corresponding colour co-ordinates for at least two colour parameters. This is equivalent to a Euclidean definition of distance and follows on the conventional definitions of distance in a colour space. In a colour space defined by colour parameters for lightness L, chroma C and hue H, a distance in a plane can be utilized by reference, for example, just to the parameters L and C, or in the space by reference to the parameters L, C and H.

A further embodiment of the method determines a distance by summating the quadratic differences weighted with different weighting factors for each colour parameter. By giving heavier weighting to one of the colour parameters, e.g. the hue, in the calculation of the distance, the shifts in hue H can be reduced.

A further embodiment of the method is obtained by establishing the second colour co-ordinates by determining an average of the selected colour values of the extended part of the boundary. By taking into account all the colour values situated on the boundary the influence of a non-continuous configuration of the boundary on the establishment of the second colour co-ordinates is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
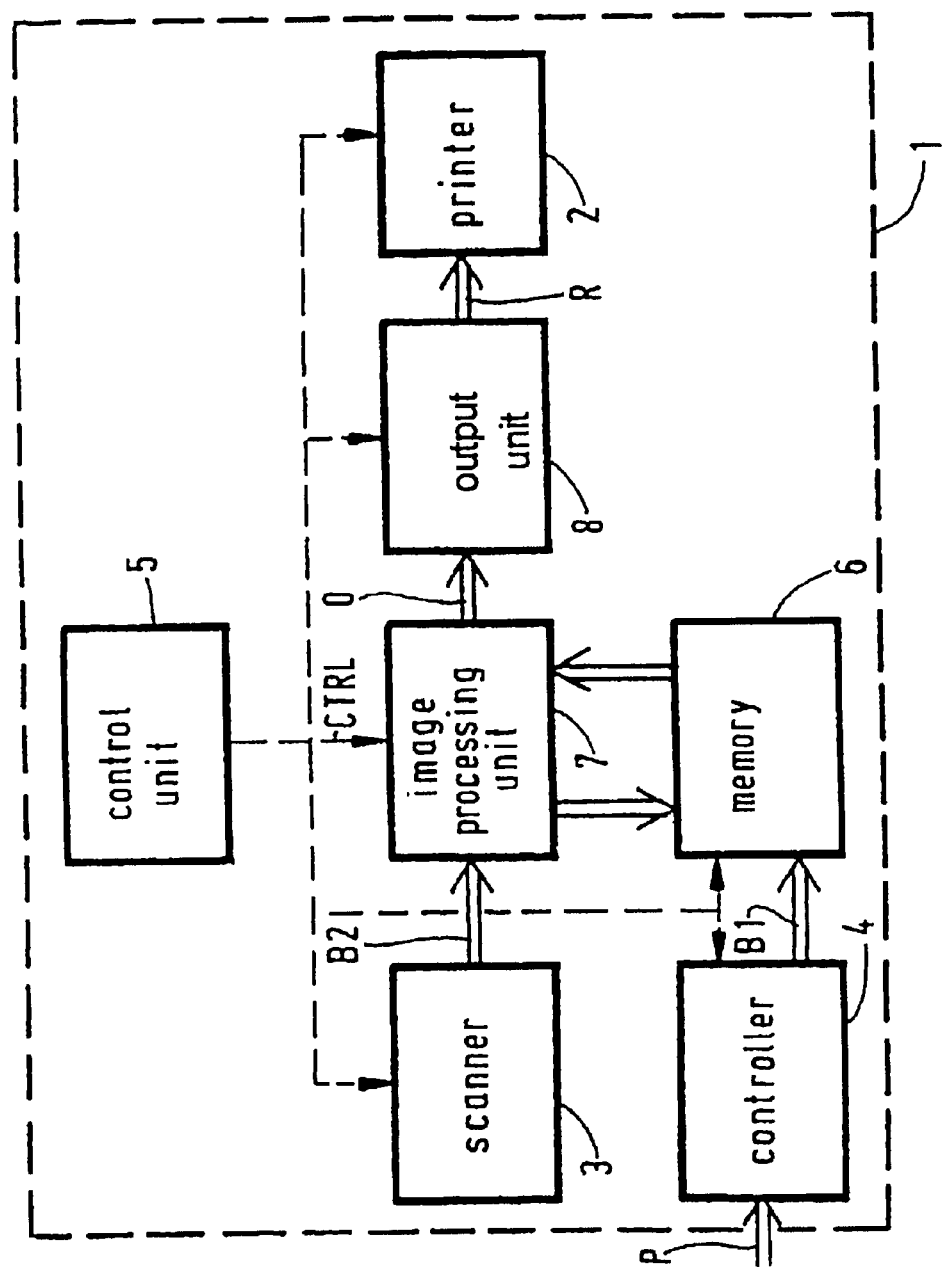
FIG. 1 shows an image reproduction apparatus for printing images by reference to received electric image signals.

FIG. 1 is a diagram showing an image reproduction apparatus 1 suitable for printing images with a printer 2 by reference to supplied electric image signals B2 which originate from a scanner 3 or electric image signals B1 originating from print signals P received via a controller 4. A control unit 5 co-ordinates the processing of these image signals B1 and B2 by the various units by using control signals CTRL which are to be fed to these units. An operator can influence this process via the control unit 5. The image signals B1 and B2 can be temporarily stored in suitable memory 6. An image processing unit 7 processes the image signals B1 and B2 in accordance with the control signals CTRL given by control unit 5 and generates output image signals O. The output image signals O are then adapted by output unit 8 to make them suitable for supply to the printer 2 in the form of reproduction signals R.

The scanner 3 is adapted to scan an original by means of photoelectric converters, such as CCDs, and to generate colour image signals R, G and B for each scanned image element, the colour image signals indicating the amount of reflected light of the separate colours red, green and blue successively. The colour image signals R, G and B are converted to digital form by analogue-digital converters, with an 8-bit coding for each signal.

The controller 4 is adapted to convert again to colour image signals R, G and B, electric print signals P generated for example by a page composition workstation or a data-processing computer. The print signals P can in this case contain character commands for printing a specific letter in a specific colour, the controller 4 having to convert these character commands into colour image signals R, G and B for each image element. This process is frequently referred to as rasterizing.

The memory 6 is adapted to store electric image signals R, G and B in digital form, preferably at least for one complete image. The memory 6 can in these conditions be provided, for example, with semi-conductor memories such as RAMs or disk memories of the magnetic type.

The image processing unit 7 provides image processing operations required by the control unit 5, such as enlargement or reduction, necessary image filter processing operations such as sharpening or smoothing and a conversion of input colours from the scanner 3 or controller 4 to output colours of the printer 2. The output unit 8 converts the 8-bit multivalue output image signals O to binary 1-bit reproduction signals R. This is also referred to as halftoning.

The printer 2 can be of the electrophotographic type provided with a photoconductor on which a charge image corresponding to the reproduction signals R is formed by laser or LED illumination and on which a ink powder toner image is then developed. The printer 2 can also be of the inkjet type, in which liquid inks are jetted directly on an information support. In the case of three-colour printing, use is normally made of inks and toners for cyan, magenta, and yellow. In the case of four-colour printing, black is added while in the case of 7-colour printing there are in addition inks and toners, for example, for the colours red, green and blue.

The image reproduction apparatus 1 is shown in FIG. 1 as an assembly of units as is the case in a colour copier. The apparatus according to the invention can also be in the form of a distributed system with the scanner 3, controller 4 and printer 2 as separately disposed units interconnected solely by a suitable communications network.

Figure 2:
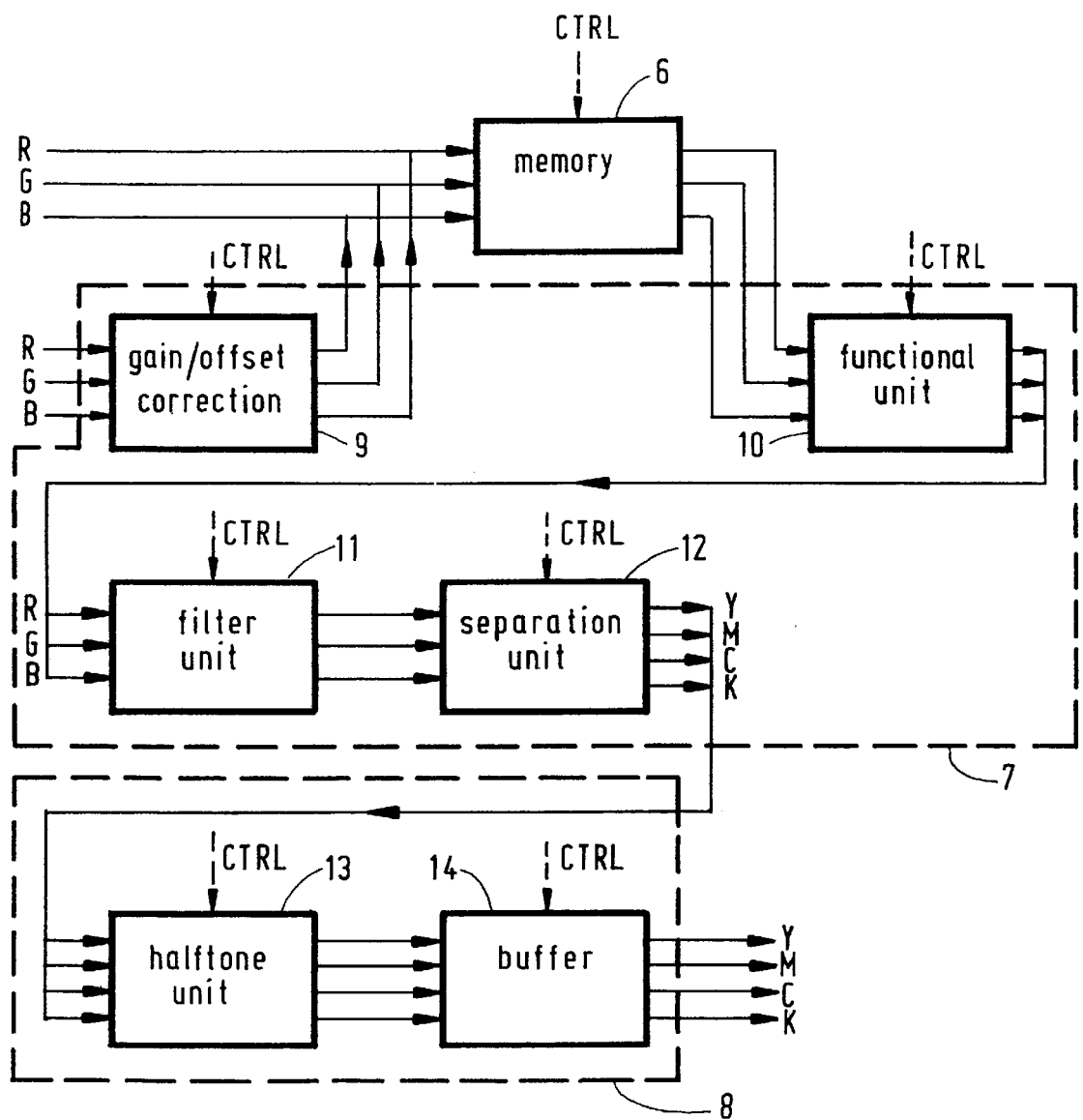
FIG. 2 shows the processing of colour value signals in the image reproduction apparatus of FIG. 1.

FIG. 2 illustrates the image processing unit 7 and the output unit 8 of FIG. 1 in greater detail. Here the image processing unit 7 comprises an amplification and offset correction unit 9. The colour image signals R, G and B fed to unit 9 by the scanner 3 are corrected for both the offset and amplification of each CCD element separately before being stored in the memory 6. A functional unit 10 is also provided with which image processing functions required by an operator can be carried out, for example enlargement, reduction, image location shift or colour conversion.

Further image processing required, for example sharpening or smoothing of image information and resolution conversion for correction of scanner and printer properties, is carried out a in filter unit 11. Finally, a separation unit 12 provides conversion of the supplied input colours to the output colours to be printed by the printer 2. In this case the colour image signals R, G and B supplied are converted to colour image signals C, M, Y and K corresponding thereto in respect of colour impression. The separation unit 12 has been provided in advance with conversion rules established by reference to measurements and calibrations. This can be in the form of a matrix of coefficients for a real-time conversion or in the form of a table in which an output colour is specified for each input colour. Clipping of colours not to be reproduced by printer 2 is also carried out in the separation unit 12. This means that a colour supplied by the scanner 3 or via the controller 4, as represented by the R, G and B signals, and for which a corresponding colour reproducible by the printer 2 is not found in C, M, Y and K signals via the separation, is allocated a reproducible colour in accordance with a specific rule. In the case of clipping, this is usually a nearby colour situated at the edge of the colour range reproducible by the printer 2. In addition to separation and clipping, an OD correction is also carried out in the separation unit 12.

The output unit 8 includes a halftone unit 13 for converting a multivalue 8-bit signal to a binary 1-bit signal. A grey value impression corresponding to a multivalue signal can be obtained by a suitable algorithm based, for example, on error diffusion or dithering, by selection of a group of binary output signals. Buffer 14 is used for temporary storage of reproduction signals which are to be fed to the printer 2.

Figures 3A, 3B:
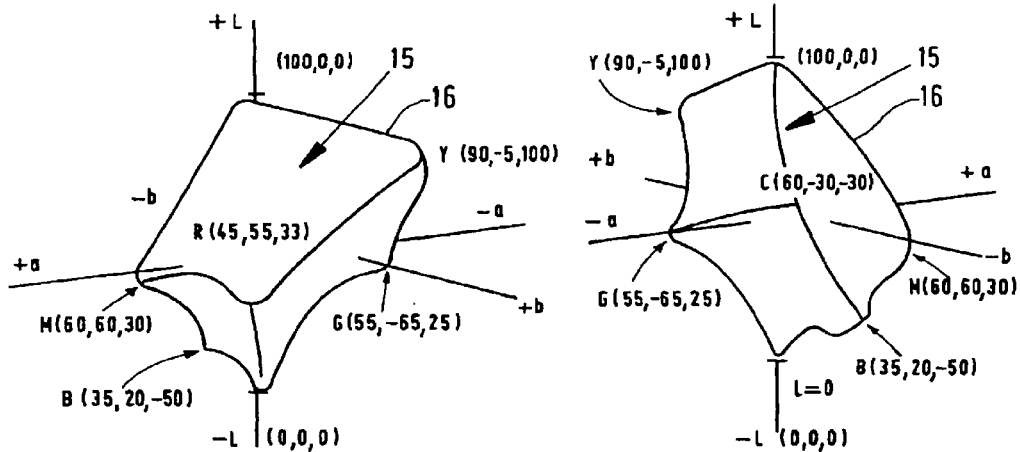
FIGS. 3A–B are diagrams showing a colour range in the CIE-Lab colour space.
Figures 4A, 4B, 4C:
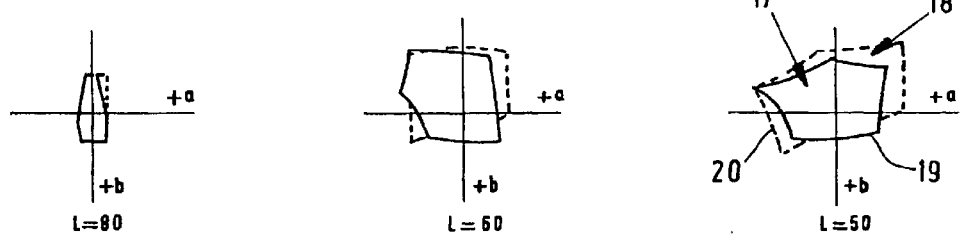
FIGS. 4A,B,C,D,E and F are cross-sections through two different colour spaces.
Figures 4D, 4E, 4F:
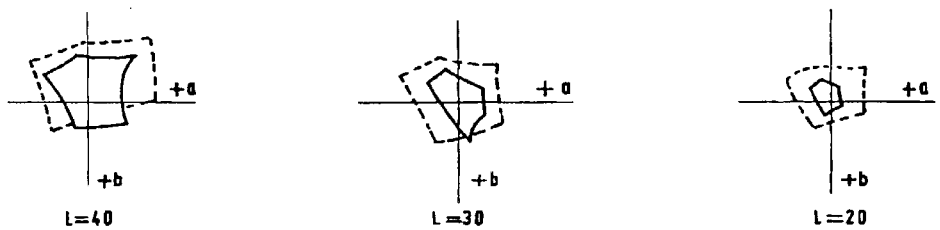

To illustrate the term "colour space", FIG. 3A shows a possible colour range in colour parameters L, a and b of a CIE-Lab colour space. Since colour defined in R, G and B or in C, M, Y and K is apparatus-dependent, the Commission Internationale d'Eclairage (CIE) formed in 1931 has defined apparatus-independent colour spaces. Two of these which are well known are the CIE-Lab colour space and the CIE-XYZ colour space. The CIE-XYZ colour space can be obtained via a linear transformation from an RGB colour space provided it is standardized with a reference for the colour white. The CIE-Lab colour space can be obtained from the CIE-XYZ colour space via a non-linear transformation. Here again a reference for the colour white is required. Another advantage of a CIE-Lab colour space is the division into a non-colour parameter L, which corresponds to the perceived lightness, and the colour parameters a and b which together define the colour and the saturation of the colour. If the colour parameters a and b are both zero, then there is no question of colour, but only a grey value, moving between L=100 for white and L=0 for black. The angle made by a vector in a plane formed by the colour parameters a and b represents a colour such as, for example, red or yellow, while the absolute magnitude of a vector of this kind represents the degree of saturation of the colour.

FIGS. 3A and 3B show a characteristic colour range 15 as can to be reproduced by the printer 2. Here, there are shown as the most saturated colour values the primary colours C, M, Y, K formed by the inks or toners and secondary colours R, G and B obtained by mixing the same, or primary colours R, G, B present in the form of toner or inks. These colours form in the colour space the projecting corner points of an irregularly formed colour range 15. The colours obtained by mixing the primary and secondary colours are generally less saturated and are closer to the L-axis. For illustration, FIGS. 3A and 3B show the values of the corresponding colour parameters as a triplet (L, a, b) of the colour parameters L, a and b. FIG. 3A is a front elevation of the colour range 15 (the "red" side), while FIG. 3B is the corresponding rear elevation (the "cyan" side). It is clear that the boundary or outer surface 16 of the colour range 15 has a non-continuous configuration with connecting lines extending concavely between the primary and secondary colours.

Although FIGS. 3A and 3B give an example of a colour range 15 reproducible by the printer 2, it can equally well be given for a colour range of an original as perceived by a colour scanner. The same applies to a colour range to be generated by a colour display.

FIGS. 4A–F show cross-sections of two different colour ranges 17 and 18 using a continuous curve 19 and a broken curve 20 in an ab-plane perpendicular to the L-axis of a Lab space for different values of L. It will be apparent that parts of the two colour ranges 17 and 18 do not overlap one another and that the boundaries 19 and 20 of the colour ranges 17 and 18 do not extend continuously but have offshoots determined by the primary and secondary colours.

In a characteristic image reproduction apparatus as described in FIG. 1, the colour range 18 shown by broken curve in FIGS. 4A–F corresponds to the colour range of an original as can be perceived by the scanner 3 or as supplied via the controller 4. The smaller colour range 17 shown by the continuous curve in FIGS. 4A–F corresponds to the colour range to be reproduced by the printer 2. Thus, the separation unit 12 shown in FIG. 2 serves not only to provide conversion of supplied colours in an RGB colour space to corresponding colours in a CMYK colour space, the actual separation, but also to clip the larger input colour range to give the smaller output colour range. In this connection it should be noted that it is immaterial to the invention in which colour space this is affected. In the image reproduction apparatus described it is also feasible for conversion to be carried out first from an RGB colour space, via a CIE-XYZ colour space, to a CIE-Lab colour space, followed by clipping and separation in the Lab colour space followed by final conversion to the CMYK colour space.

Figure 5A:
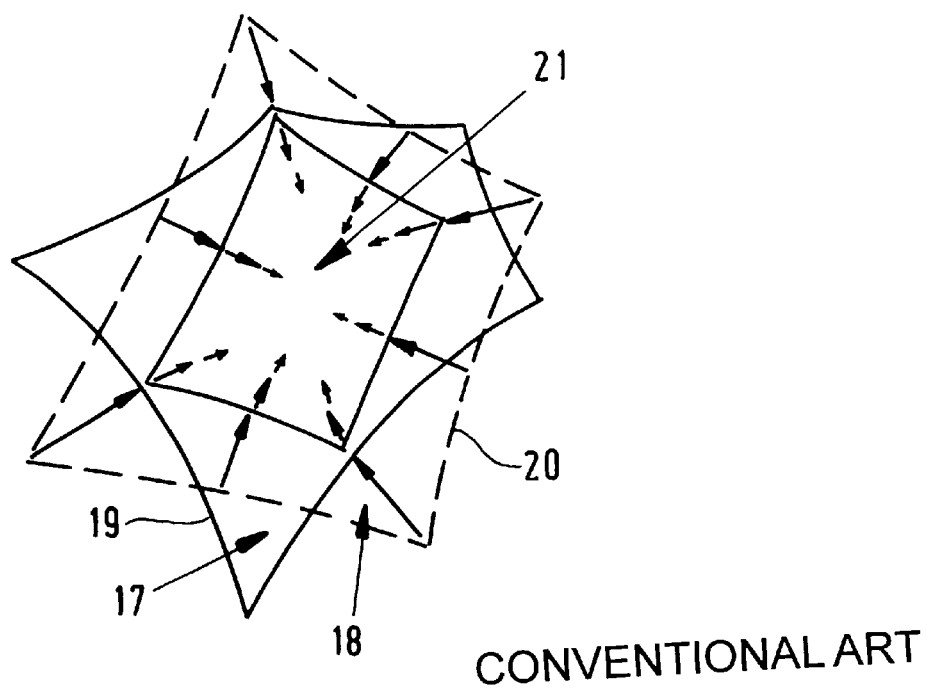
FIGS. 5A–B show the principle of compressing and clipping colour values.

In a colour space which is not defined in detail, FIG. 5A illustrates a known principle of imaging a larger colour range 18 of this kind, the boundary of which is denoted by a broken curve 20, on a similar smaller or differently situated colour range 17, the boundary of which is shown by a continuous curve 19. The principle is known as compression, in which the larger colour range 18 is compressed to a reduced replica 21, of which all the colours fall inside the smaller colour range 17. In this case, therefore, all the colours of the colour range 18 for compression are changed, including the colours which were already situated inside the smaller colour range 17 before compression. The advantage of compression is that the colour differences are maintained between one another. The disadvantage of compression, however, is that the saturation of all the colours falls off.

Figure 5B:
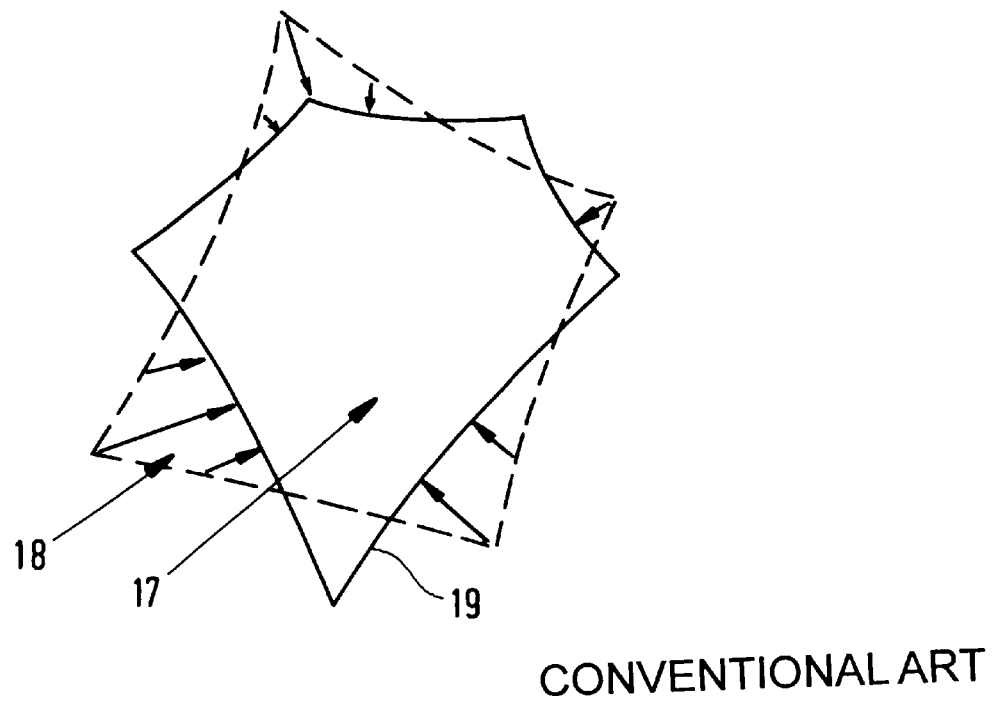

FIG. 5B illustrates the principle of clipping. In this case, only colours of the larger colour space 18 which are situated outside the smaller colour space 17 are converted to colours situated on the boundary 19 of the smaller colour space 17. The disadvantage of clipping, however, is that differences between colours may disappear or even increase.

Figure 6:
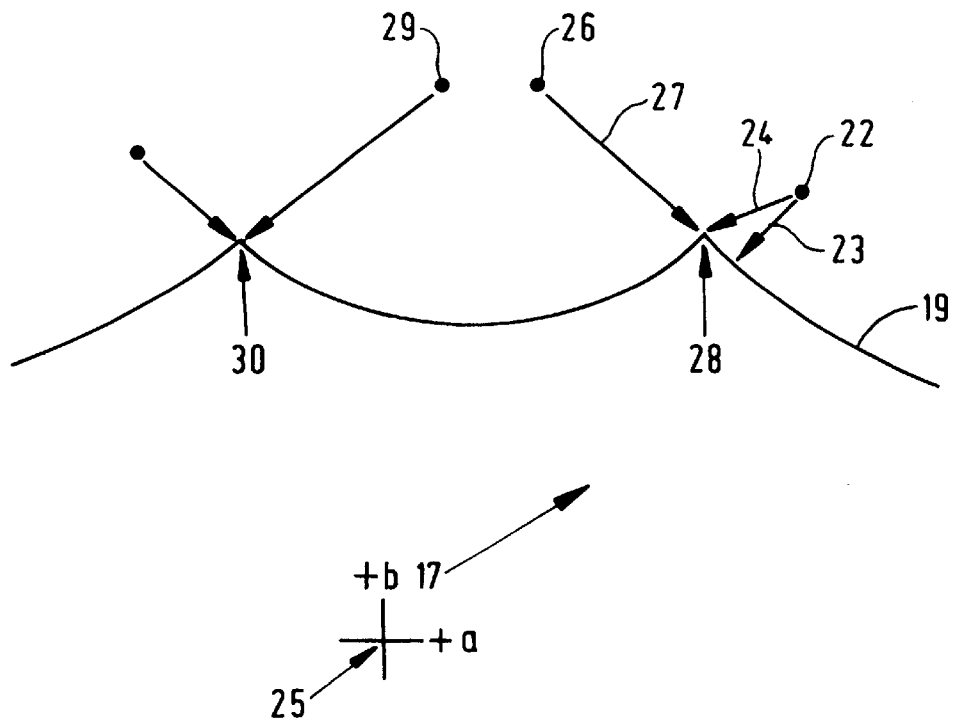
FIG. 6 shows a number of examples of clipping colour values based on a minimum distance in the colour space.

FIG. 6 shows in greater detail the adverse effects of clipping. FIG. 6 shows part of a colour space 17 in a plane perpendicular to the L-axis of a CIE-Lab colour space. A first colour 22 situated outside the colour space 17 can be converted, by means of various algorithms, to a colour situated on the boundary 19. An example of an algorithm is a clip algorithm in which, for example, the attempt is made to retain the colour as defined by the angle in the ab-plane. This can be effected by shifting the colour 22 for clipping along the vector 23 to the L-axis. The position of the L-axis is shown at 25 in FIG. 6. In this case the colour is retained at the cost of, possibly, saturation and luminance. Another clip algorithm is obtained by searching for a point on the boundary 19 situated at the smallest possible distance from the colour 22 for clipping. This is illustrated in FIG. 6 by the shift along the vector 24. Apart from different choices for the clip algorithm, it is important to realize that the term "minimum distance" in a colour space is not always clearly defined.

A colour space can, for example, be interpreted as a Euclidean or geometric space. In the case of an n-dimensional space defined by n parameters, the distance $\rho(Y_i, Y_j)$ between two points $Y_i$ and $Y_j$ is given by $$\rho(Y_i, Y_j) = \sqrt{((Y_{i1} - Y_{j1})^2 + \ldots + (Y_{in} - Y_{jn})^2)} \quad (1)$$

Although this Euclidean or geometric distance concept will be used in the following description, it is equally possible to use a different distance concept. For example, by interpreting a colour space as a Riemann space.

Starting from the Euclidean distance concept, then, for example, in a CIE-Lab colour space the distance $\Delta E_{lab}$ is given by:

$$\Delta E_{lab} = [(\Delta L)^2 + (\Delta a)^2 + (\Delta b)^2]^{1/2} \quad (2)$$

Thus, a similar distance can be defined in each colour space. It is possible to add a perceptual correction as in the following CMC expression for distance in an LCH colour space as introduced by the "Colour Measurement Committee":

$$\Delta E_{CMC} = [(\Delta L/S_L)^2 + (\Delta C_{ab}/S_C)^2 + (\Delta H_{ab}/S_H)^2]^{1/2} \quad (3)$$

where $S_L$, $S_C$ and $S_H$ are perceptual correction factors. In this connection it should be noted that the LCH space is the cylindrical equivalent of the cartesian Lab space, where H (hue) is the angle and C (chroma) gives the length of a vector in a plane perpendicular to the L-axis.

A variation of the above expression is obtained by giving the colour component H greater weighting in the expression so that the H-value of a converted colour is retained to a greater extent. This expression is accordingly referred to as the weighted $\Delta E_{CMC}$ distance formula:

$$\Delta E_{CMC} = \{3/(2+w)[(\Delta L^*/S_L)^2 + (\Delta C^*_{ab}/S_C)^2 + w(\Delta H^*_{ab}/S_H)^2]\}^{1/2} \quad (4)$$

with, for example, 4 as a typical value for w.

In addition it is possible to limit the distance concept to two colour parameters, for example by omitting the Croma:

$$\Delta E_{CMC} = [(\Delta L^*/S_L)^2 + (\Delta H^*_{ab}/S_H)^2]^{1/2} \quad (5)$$

Although the above expressions for distance cannot always be reproduced graphically, FIG. 6 gives an adequate impression of the problems that can occur if a colour value is converted to a closest colour value, given an expression for distance. It is clear that the colour values 22 and 26 in the case of a clip algorithm based on a minimum distance are converted along the vectors 24 and 27 to the same colour value 28. Moreover, colour values 26 and 29 situated close to each other, in the situation shown in FIG. 6, are converted to colour values 28 and 30 which are situated further apart. It is also clear that the non-continuous configuration of the boundary 19 of the colour space is the cause of these adverse effects. In particular, a colour range whose boundary between colour values given by the primary colours has a concave configuration will have the above-mentioned adverse effects.

Figure 7:
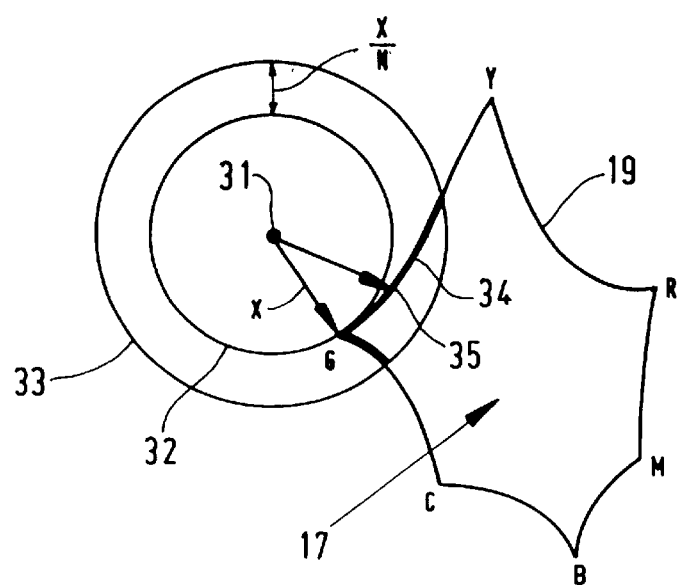
FIG. 7 shows the principle of converting colour values situated outside a colour space, in accordance with the invention.

FIG. 7 is a diagram showing one embodiment of a clip algorithm according to the invention, which largely eliminates the above adverse effects.

FIG. 7 shows the boundary 19 of the colour range 17 in an ab-plane perpendicular to the L-axis of a CIE-Lab colour space. The colour range 17 is defined by the primary and secondary colours C, M, Y, R, G, and B, the colour values of which are indicated by corresponding notations. The minimum distance X in the colour space from a colour value 31 which is to be converted to the colour range 17, to a closest colour value of the boundary 19 is determined. In this case it is the colour value G. This minimum distance X defines a first reach shown by a circle 32 as seen from the colour value 31. A second, larger, reach is then constructed by determining a second, larger circle 33 with a radius which is a fraction N of the minimum distance X larger than the radius of the first circle 32. The boundary section of the colour range 17 that is located between the first and the second reaches (32 and 33, respectively) is shown by a wider line (bolded) 34 in FIG. 7. The colour values situated on the boundary section (34) are used to determine the colour value to which the colour value 31 must be converted. One embodiment is obtained by determining the arithmetic mean of colour values of the boundary situated between the circles 32 and 33. Another embodiment is obtained by determining a centre of the curved plane indicated diagrammatically by the line 34. In this way the colour value 31 is converted to the colour value 35.

Since the margin becomes smaller as the minimum distance X becomes smaller, there is a gradual correction obtained for colour values situated just near the boundary 19. The influence of non-continuities in the configuration of the boundary 19, as caused by the colour values corresponding to the primary and secondary colours, is thus so reduced that the adverse effects shown in FIG. 6 occur much less markedly, if at all.

In this connection it should be noted that although the method has been explained by reference to a circle in a flat plane, it must in fact be applied in a three-dimensional space in which the circular ranges are replaced by spherical ranges. For instance, the circles 32 and 33 shown in FIG. 7 denote spheres (3-dimensional). Also, other embodiments can be obtained by different choices of the form of a range or the determination of the margin. It is essential that a larger part of the boundary is used for determining the ultimate colour to which conversion is to take place, the size of the selected boundary section being dependent on the size of the minimum distance S.

Figure 8:
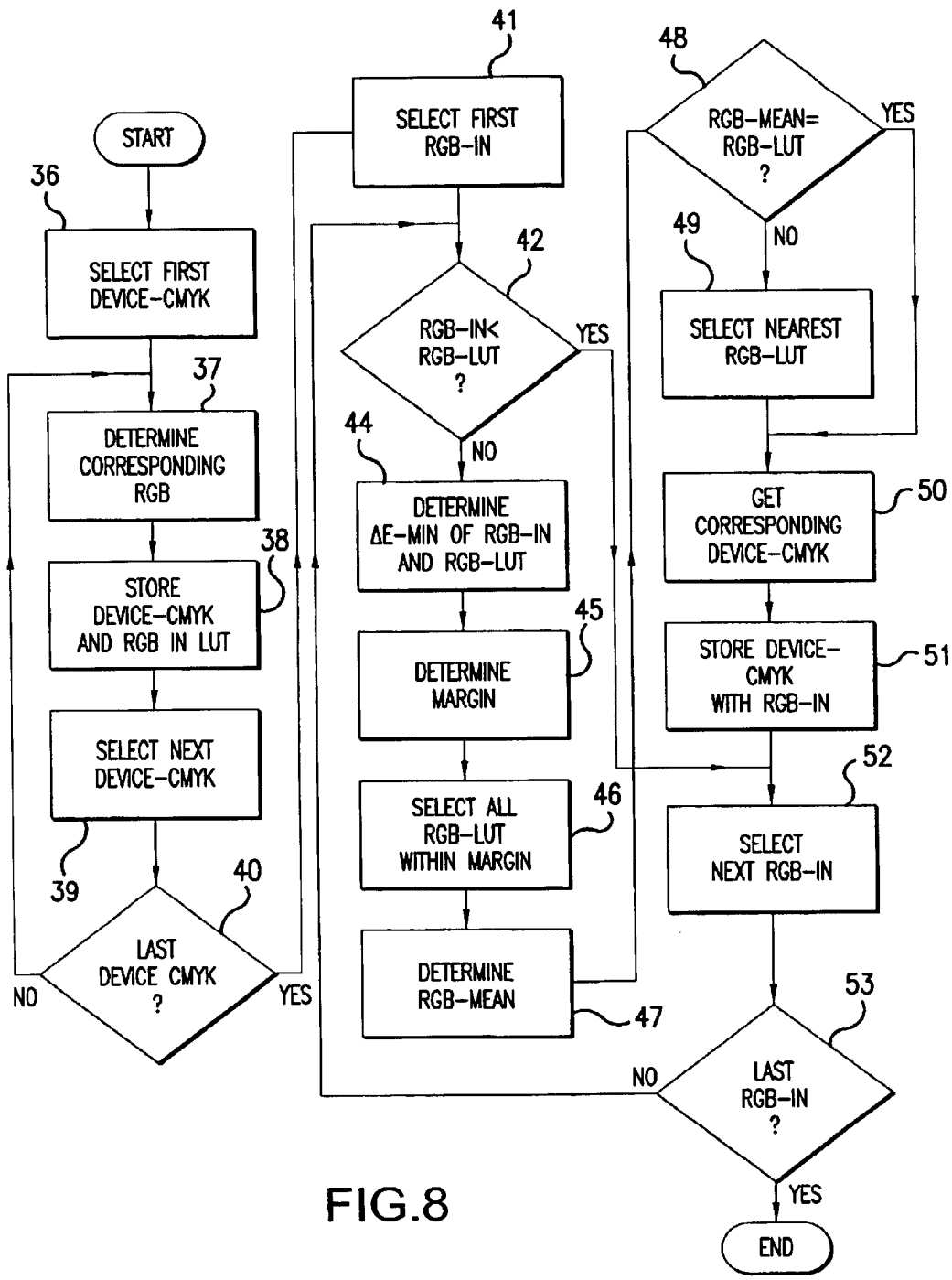
FIG. 8 shows a method according to the invention.

FIG. 8 illustrates a first embodiment of a method according to the invention as illustrated in FIG. 7. According to the method, a look-up table is filled with the possible input colour values as the input values and the corresponding output colour values as the output values coupled thereto. Searching for a colour value from a predetermined look-up table of this kind is quicker than always having to re-calculate the colour value.

In a first step 36, a first reproducible colour value of a CMYK printer is selected as the output colour value. The input colour value corresponding thereto is then determined in a separation step 37 in the form of values for R, G and B. Both the selectable CMYK values and the selectable RGB values are defined by an (arbitrarily chosen) grid in the respective colour spaces. When a CMYK value does not exactly correspond to a selectable RGB value, the nearest RGB value that is selectable is chosen. A separation of this kind can be carried out by reference to calibration planes and a colorimeter and will not be described further in greater detail. The RGB colour value belonging to the CMYK colour value is then stored in the look-up table as a corresponding input and output colour value in step 38. The following reproducible CMYK value is then selected in a new selection step 39 in order to find the corresponding RGB colour value.

This process is then repeated, via step 40, for all the reproducible CMYK colour values. The look-up table is then filled with input colour values for which there is an output colour value to be reproduced. One of the output colour values present in the look-up table must then be selected for the other possible input colour values. For this purpose, a first possible input colour value in the form of an RGB colour value is selected in step 41. Step 42 checks whether this RGB colour value has already been found in the first steps 36 to 40 and is therefore already contained in the look-up table. If that is the case, the following possible RGB colour value is selected in step 52. If step 42 shows that the selected RGB colour value does not yet occur in the look-up table, then in step 44 a minimum distance $\Delta E_{min}$ between this selected colour value and the RGB colour values already stored in the look-up table is determined. For this purpose, one of the expressions described above can be used to determine a distance between two colour values in a colour space. This determination need not necessarily take place in an RGB or CMYK colour space, but can be carried out, via known transformations, for example in an apparatus-independent CIE-Lab colour space.

If required, it is possible to use an intermediate table in which only the RGB values situated on the boundary of the colour range are contained. An intermediate table of this kind could be filled after step 40.

The minimum distance $\Delta E_{min}$ found in step 44 is then used in step 45 to determine the margin described in FIG. 6. In this case the margin is determined by the range situated between a first and second distance range in the colour space from the selected RGB colour value or the equivalent thereof in, for example, the CIE-Lab colour space. In one embodiment, the radius of the first distance range is given by the minimum distance $\Delta E_{min}$ and the radius of the second distance range by:

$$\Delta E_{min} + \Delta E_{min}/N \quad (6)$$

Here N is preferably greater than 1. In one embodiment N is 10. It should be noted here that another function than that indicated above may be suitable. The only essential factor is that the size of the radius of the second distance range is dependent on the minimum distance $\Delta E_{min}$ and decreases with a decreasing $\Delta E_{min}$. All those RGB colour values occurring in the look-up table and situated on the boundary of the colour range and which are situated within the margin are then selected in step 46. On the basis of the RGB colour values thus selected an average RGB colour value is determined in step 47. The average RGB colour value in these conditions is given by the following triplet of the colour parameters R, G and B:

$$(R,G,B) = (\Sigma R_i/n, \Sigma G_i/n, \Sigma B_i/n) \quad (7)$$

where n is the number of RGB colour values selected in step 46.

In one embodiment, the arithmetic mean for each colour parameter is determined on the basis of the selected colour values. Step 48 then checks whether this average value does occur in the look-up table. If this is not the case, then the closest RGB colour value is selected in step 49. In this case, selection is preferably from the RGB values selected in step 46. The CMYK colour value corresponding to the average RGB colour value or the nearest to the average RGB colour value and forming part of the selected RGB colour values is then brought up from the look-up table in step 50. This CMYK colour value is then allocated in step 51, as a clipped colour value, to the RGB colour value selected in step 41 or step 52.

This process is then repeated through step 52 and 53 for all the possible RGB colour values. The end result is a look-up table in which there is given not only a conversion of reproducible, but also non-reproducible, RGB input colour values, the last conversion being obtained in accordance with the method according to the invention.

It should finally be noted that a number of embodiments can be obtained for the determination of the average RGB colour value in step 47 by the method of calculating the average.

Figure 9:
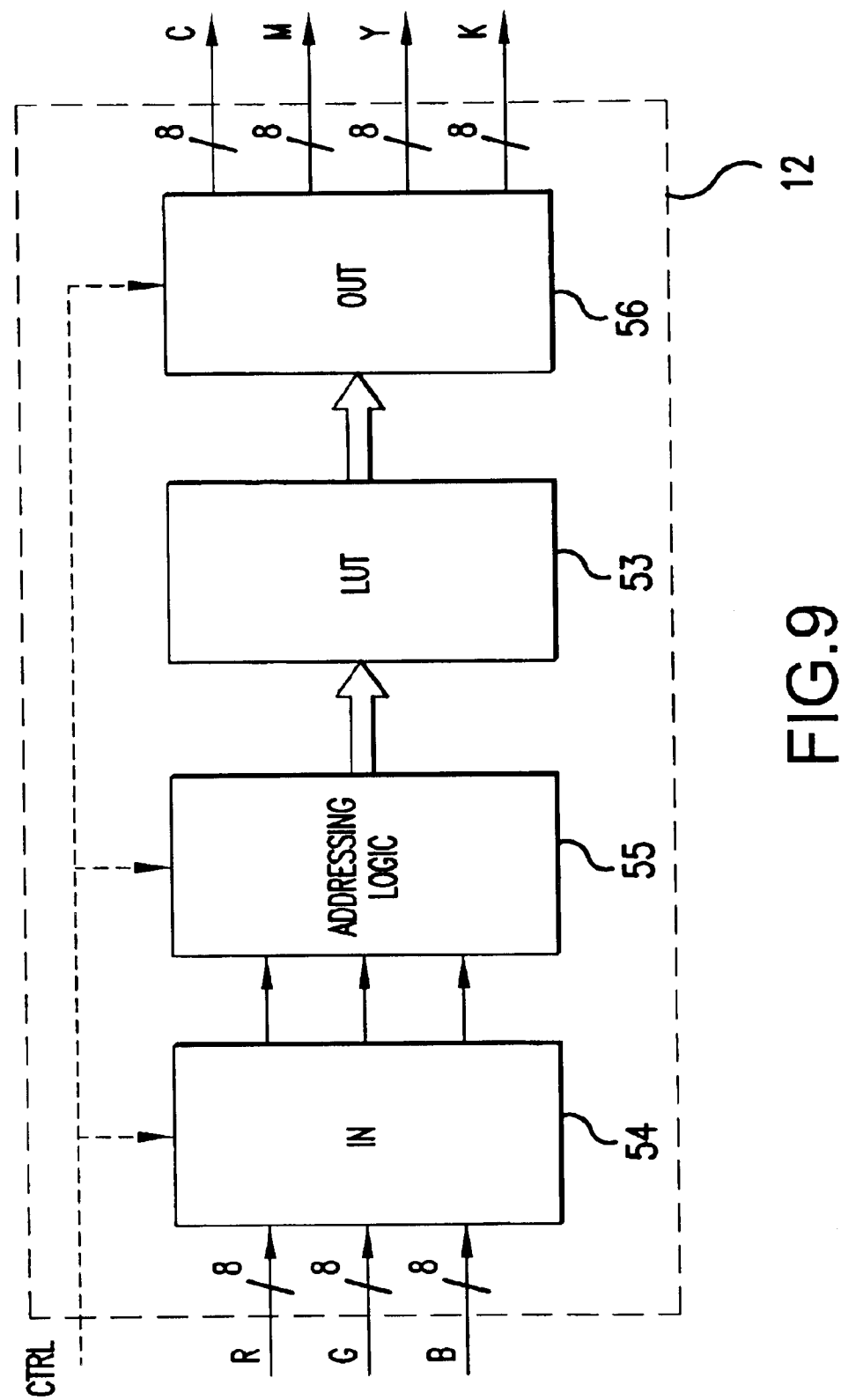
FIG. 9 is a first embodiment of an image reproduction apparatus according to the invention.

FIG. 9 shows in detail the separation unit 12 illustrated in FIG. 2. In this case the separation unit 12 is provided with memory 53 which contains a look-up table as obtained with the method described with reference to FIG. 8. The type of memory is in this case preferably of the semiconductor type, e.g. a ROM, EPROM or the like. A memory of this kind is fast and does not require any power supply. In other devices, however, it may be advantageous to use a RAM or even magnetic or optical storage media for the purpose.

The 8-bit input colour value signals R, G and B corresponding to RGB colour values are buffered in an input buffer 54 and then fed to suitable addressing logic 55 in order to select from the look-up table stored in memory means 53 an input address corresponding thereto. The output value stored at this input address is then read out via an output buffer 56 for generation of output colour signals C, M, Y and K corresponding thereto.

Although FIG. 9 shows a separation unit 12 according to the invention in which pre-calculated conversions of input colour signals to output colour signals are stored, it is equally possible to calculate these conversions each time, or at least calculate just the clipping of non-reproducible colour values.

Figure 10:
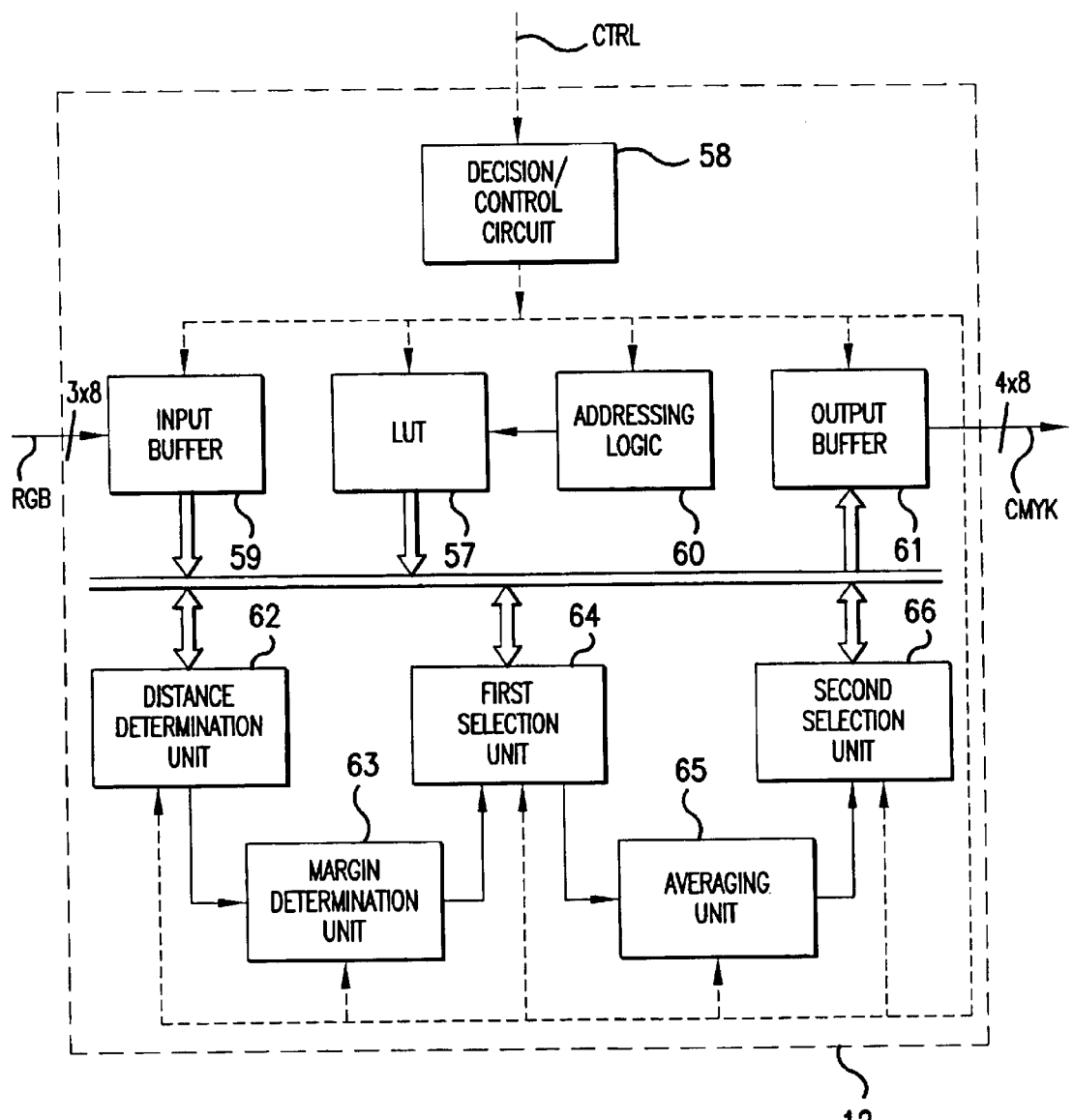
FIG. 10 is a second embodiment of an image reproduction apparatus according to the invention.

FIG. 10 is an example of a second embodiment of a separation unit 12 of the image reproduction apparatus according to the invention to illustrate this in greater detail. The memory 57 provided here now includes just a look-up table for conversion of reproducible input colour signals R, G and B to output colour signals C, M, Y and K. The incoming input colour signals R, G and B which do not occur in the the look-up table are then determined separately according to the method of the invention. For this purpose, the separation unit 12 is provided with a decision and control unit 58 in which it is decided whether conversion can be determined by reference to the look-up table or clipping must be carried out to a value of the look-up table. The received 8-bit input colour signals R, G and B are for this purpose temporarily stored in an input buffer 59, whereafter the decision and control unit 58 checks, via an addressing unit 60, whether a corresponding input colour value occurs in the look-up table. If it does, then the associated output colour value is read out and fed to an output buffer 61 for generation of output colour signals C, M, Y and K corresponding to this output colour value.

If the incoming input colour value does not occur in the look-up table, then a minimum distance $\Delta E_{min}$ in the colour space as far as the colour values contained in the look-up table is then determined, in a distance determining unit 62, in accordance with the method described with reference to FIG. 8. A margin determining unit 63 then determines the margin illustrated in FIG. 7 in the colour space, which is used by a first selection unit 64 in order to select from the memory means 57 the colour values situated therein. An averaging unit 65 then determines an average colour value by reference to the selected colour values. By reference to the average colour value found a second selection unit 66 then selects an output colour value for reproduction from the look-up table in accordance with the method described in connection with FIG. 8. This output colour value is finally fed to the output buffer 61.

It will be clear to one of ordinary skill in the art in which situation and to what extent it is preferable to use a look-up table or always carry out a calculation. This will not only depend on the type of image reproduction apparatus but also on the cost price and speed of the hardware required. With regard to the hardware, the units described in FIG. 10 can be constructed both as discrete digital circuits or as program modules in a software program to be carried out by a central computer processor. In the latter case it is also possible for the same program first to arrange for a look-up table to be filled in in accordance with the invention and then have the same program make use of said look-up table.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of converting a first colour value as determined by first colour co-ordinates in a colour space defined by colour parameters the first colour co-ordinates being situated outside a boundary of a predetermined colour range situated in the colour space, to a second colour value determined by second colour co-ordinates in the colour space, the second colour co-ordinates being situated on the boundary of the colour range, the method comprising:

determining, in accordance with a selection rule, a part of the boundary situated in the colour space closest to the first colour co-ordinates;

extending, in accordance with the selection rule, the closest part of the boundary by a part of the boundary situated in the colour space further away from the first colour co-ordinates, in dependence on the distance of the first colour co-ordinates from the boundary; and establishing the second colour co-ordinates on the basis of the extended part of the boundary.

2. The method according to claim 1, wherein said colour space is a CIE-Lab or a CIE-XYZ colour space.

3. The method according to claim 1, further comprising:

storing the first and second colour co-ordinates in a transformation table having the first colour values as input values and the second colour values as output values.

4. The method according to claim 1, said extending step selecting a part of the boundary which is situated between a first and a second distance from the first colour co-ordinates defined in the colour space, wherein the first distance corresponds to the distance between the part of the boundary situated closest to the first colour co-ordinates, and the first colour co-ordinates, and the second distance is larger than the first distance.

5. The method according to claim 4, said establishing step establishing the second distance by enlarging the first distance by a value equal to a constant factor times the first distance.

6. The method according to claim 1, said determining and extending steps determining a distance between two colour values in the colour space on the basis of a summation of quadratic differences between the corresponding colour co-ordinates for at least two colour parameters.

7. The method according to claim 6, said determining and extending steps determining a distance by summating the quadratic differences weighted with different weighting factors for each colour parameter.

8. The method according to claim 1, said establishing step establishing the second colour co-ordinates by determining an average of the selected colour values of the extended part of the boundary.

9. The method according to claim 8, further comprising:

allocating the average of the selected colour values as a second colour value in the event that the average forms part of the boundary of the predetermined colour range, or otherwise allocating a colour value from the selected colour values on the boundary of the predetermined colour range situated closest to the average, as the second colour value.

10. An image reproduction system for reproducing a colour image comprising:

an input unit for receiving electric input image signals having first colour value signals corresponding to colour co-ordinates in a colour space defined by colour parameters;

a processor, operatively connected to said input unit, said processor generating electric output image signals having second colour value signals whose corresponding colour co-ordinates are situated within a predetermined colour range situated in the colour space;

an output unit operatively connected to said processor generating reproduction signals; and an image reproduction apparatus connected to said output unit and suitable for reproducing colours with colour co-ordinates situated within the predetermined colour range for reproducing a colour image by reference to image reproduction signals to be fed to said image reproduction apparatus, said processor including a colour converter being adapted to convert a first colour value signal corresponding to first colour co-ordinates being situated outside a boundary of the predetermined colour range to a second colour value signal corresponding to second colour co-ordinates which are situated on the boundary of the predetermined colour range, said colour converter being adapted to generate the second colour value signal corresponding to the second colour co-ordinates, on the basis of colour co-ordinates which are situated in an extended part of the boundary of the predetermined colour range, which extended part is situated at a distance from the first colour co-ordinates greater than a minimum distance from the first colour co-ordinates to the boundary, the extended part being determined in dependence on the minimum distance of the first colour co-ordinates from the boundary.

11. The image reproduction system according to claim 10, said colour converter being adapted to generate the second colour signal on the basis of colour co-ordinates in a CIE-Lab or CIE-XYZ colour space.

12. The image reproduction system according to claim 10, said colour converter including a memory for generating a predetermined output code on receipt of a corresponding input code, said colour converter being adapted to feed to said memory an input code corresponding to the first colour co-ordinates and generate the second colour signal by reference to the output code generated by said memory as a result.

13. The image reproduction system according to claim 10, wherein said image reproduction apparatus is constructed as a printing device suitable for printing a colour image on an image support to be fed to the printing device and the predetermined colour range corresponds to a colour range which can be reproduced by the printing device.

14. The image reproduction system according to claim 10, said colour converter being adapted to generate the second colour value signal on the basis of an extended part of the boundary situated between a first and second distance, defined in the colour space, from the first colour co-ordinates, the first distance corresponding to the minimum distance between the part of the boundary closest to the first co-ordinates and the first colour co-ordinates, and the second distance being greater than the first distance.

15. The image reproduction system according to claim 14, said colour converter being adapted to generate the second colour value signal on the basis of the extended part of the boundary, the second distance being enlarged by a value equal to a constant factor times the first distance.

16. The image reproduction system according to claim 14, said colour converter being adapted to generate the second colour value signal, a distance between two colour values in the colour space being determined on the basis of a summation of quadratic differences between the corresponding colour co-ordinates for at least two colour parameters.

17. The image reproduction system according to claim 14, said colour converter being adapted to generate the second colour value signal, a distance between two colour values in the colour space being determined by weighted summation of the quadratic differences for each colour parameter.

18. The image reproduction system according to claim 14, said colour converter being adapted to generate the second colour signal on the basis of an average of colour values of the extended part of the boundary in the event that the average forms part of the predetermined colour range, or else on the basis of a colour value situated on the boundary of the predetermined colour range which is closest to the average.

* * * * *